United States Patent
Giddings et al.

(10) Patent No.: US 7,669,883 B2
(45) Date of Patent: Mar. 2, 2010

(54) AIR BAG BRACKET/FASTENER

(75) Inventors: Joshua J. Giddings, Chesterfield, MI (US); Patricia E. Patt, Harrison Township, MI (US); Terri L. Wernert, China Township, MI (US); Thomas J. Lerch, Shelby Township, MI (US); Carl Lesser, Chesterfield, MI (US); Wolfgang Werner, Reutlingen (DE); Siegfried Lautner, Schwaebisch Gemuend (DE)

(73) Assignee: Newfrey LLC, Newark, DE (US)

( * ) Notice: Subject to any disclaimer, the term of this patent is extended or adjusted under 35 U.S.C. 154(b) by 51 days.

(21) Appl. No.: 12/041,906

(22) Filed: Mar. 4, 2008

(65) Prior Publication Data

US 2008/0238046 A1 Oct. 2, 2008

Related U.S. Application Data

(60) Provisional application No. 60/920,609, filed on Mar. 29, 2007.

(51) Int. Cl.
*B60R 21/16* (2006.01)
(52) U.S. Cl. ................................... 280/728.2
(58) Field of Classification Search ............. 280/728.2, 280/730.2
See application file for complete search history.

(56) References Cited

U.S. PATENT DOCUMENTS

| 4,457,482 | A  | * | 7/1984  | Kitagawa ............... 248/74.3 |
| 5,937,745 | A  | * | 8/1999  | Boe ........................ 100/2 |
| 6,504,101 | B2 | * | 1/2003  | Kondoh ................. 174/135 |
| 7,207,529 | B2 | * | 4/2007  | Rosemann et al. ........ 248/71 |
| 7,338,068 | B2 | * | 3/2008  | Kawai et al. ......... 280/728.2 |
| 2006/0255568 | A1 | * | 11/2006 | Demel et al. ......... 280/728.2 |
| 2007/0158931 | A1 | * | 7/2007  | Baumgartner et al. .. 280/728.2 |
| 2008/0048418 | A1 | * | 2/2008  | Remley et al. ......... 280/728.2 |
| 2008/0084050 | A1 | * | 4/2008  | Volkmann et al. ..... 280/728.2 |
| 2009/0020986 | A1 | * | 1/2009  | Baumgartner et al. .. 280/728.2 |

* cited by examiner

*Primary Examiner*—Faye M. Fleming
(74) *Attorney, Agent, or Firm*—Michael P. Leary; Stephen R. Valancius

(57) ABSTRACT

An airbag installation fastener includes first and second fastener members connected by a hinge member. The first and second fastener members rotate from a fastener open condition to engage each other in a fastener closed position. The fastener closed position provides for an air bag member positioned between the first and second fastener members. The first and second fastener members have an aperture receiving a vehicle connected stud to support both the airbag installation fastener and the air bag member from the stud. An arm extending from the second fastener member rotates with respect to the second fastener member. The arm extends from the second fastener member in the fastener closed condition and both engages the second fastener member and abuts the stud to visually indicate a fastener completed installation condition.

25 Claims, 7 Drawing Sheets

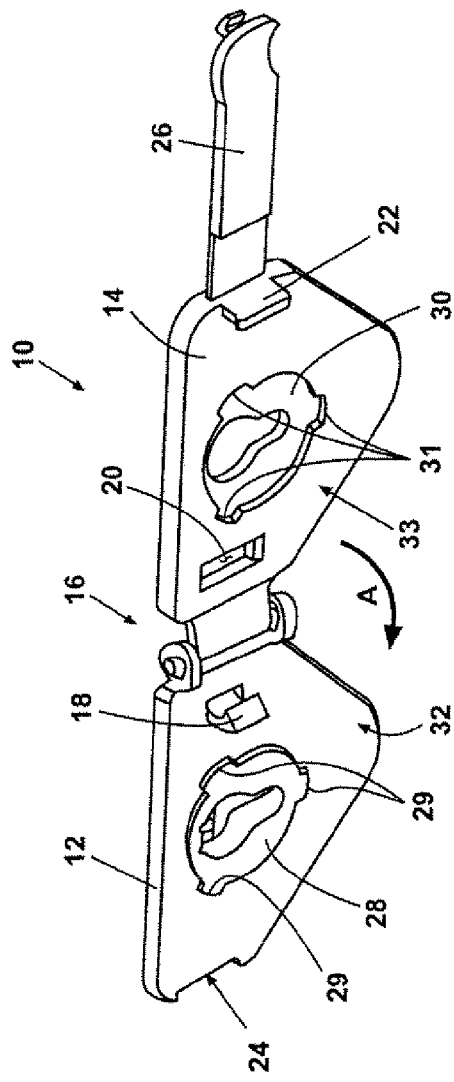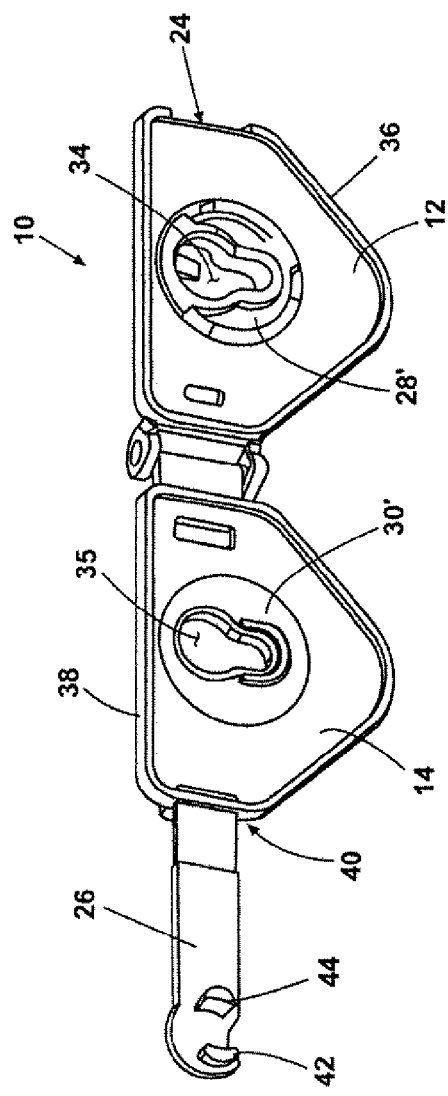

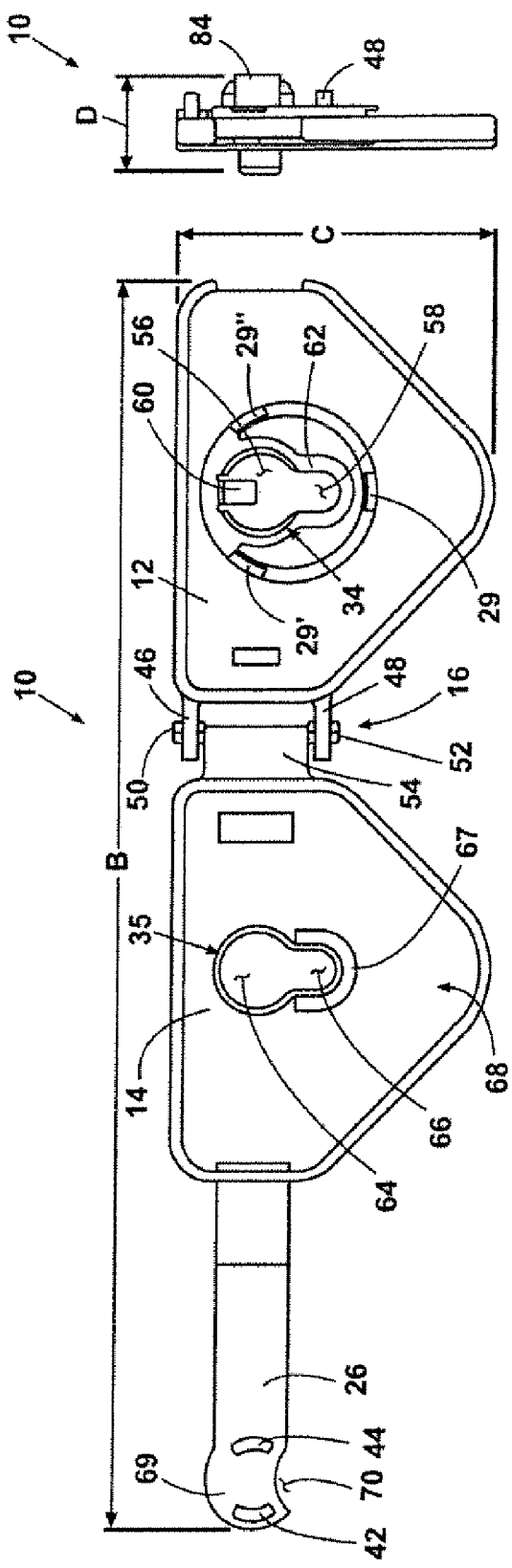
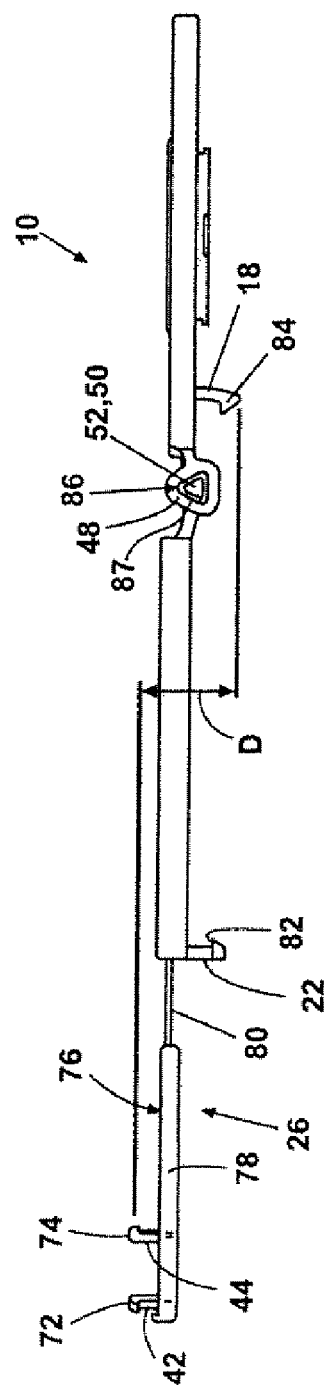

AIR BAG BRACKET/FASTENER

CROSS-REFERENCE TO RELATED APPLICATIONS

This application claims the benefit of U.S. Provisional Application No. 60/920,609 filed on Mar. 29, 2007, the disclosure of which is incorporated herein by reference.

FIELD

The present disclosure relates to automobile air bag fasteners and a method for installing fasteners to connect automobile vehicle air bag assemblies.

BACKGROUND

The statements in this section merely provide background information related to the present disclosure and may not constitute prior art.

In automobile air bag applications, fasteners are used to join the air bag directly to a vehicle panel or to a trim piece which is subsequently installed to sections or metal body portions of the automobile. Common fasteners used for these applications have a torque applied to the fastener which is remotely connected to an information collection device such as a computer, which receives an indication of the torque applied. When a predetermined torque value is indicated, an auditable record is generated of the completed installation of the fastener. Drawbacks of the torque fastener are the costs of the fastener and the need for both the torque application tool and the electronic circuitry required to record the torque signal. Also, remote indication of a correctly applied torque does not by itself ensure that the fastener and therefore the air bag have been installed in the correct location in the vehicle.

Clip fasteners have been substituted for the above torque fasteners due to their reduced costs and simplified installation. Clip fasteners are commonly made of molded plastic material. When the clip fastener is made of a polymeric material and is not installed using an electrically connected torque driver, an auditable electronic record of clip fastener installation is commonly not available. A visual, auditable confirmation of correct installation of each clip fastener is therefore required. Known clip fasteners do not provide for ease of installation and a visual, auditable confirmation of their correct installation.

SUMMARY

According to several embodiments of an air bag bracket fastener of the present disclosure, an airbag installation fastener includes first and second fastener members connected by a hinge member. The first and second fastener members are adapted to rotate from a fastener open condition to engage each other in a fastener closed position. The fastener closed position provides for an air bag member positioned between the first and second fastener members. Each of the first and second fastener members has an aperture adapted to receive a vehicle connected stud to support both the airbag installation fastener and the air bag member from the stud. An arm extending from the second fastener member is adapted to rotate with respect to the second fastener member. The arm extends from the second fastener member in the fastener closed condition and is operable to both engage the second fastener member and to abut the stud to visually indicate a fastener completed installation condition.

According to other embodiments, an airbag installation fastener for connecting an airbag to an automobile vehicle includes a polymeric body having homogenously connected members in a fastener open condition. The body includes first and second fastener members and a hinge member between the first and second fastener members. At least one deflectable engagement post homogenously extends from one of the first and second fastener members. The other one of the first and second fastener members has an aperture adapted to receive the engagement post to engage the first and second fastener members. A hinge pin homogenously connected to the second fastener member is received in a hinge pin aperture of a hinge arm homogenously connected to the first fastener member. The first and second fastener members are adapted to rotate from the fastener open condition to a fastener closed condition frangibly disconnecting the hinge pin from the hinge arm. The fastener closed condition has the first and second fastener members engaged to each other by the engagement post and adapted to receive an air bag member between the first and second fastener members.

According to still other embodiments, an airbag installation fastener for connecting an airbag to an automobile vehicle includes a first fastener member having a raised surface. A second fastener member adapted to engage the first fastener member has a recessed surface adapted to receive the raised surface of the first fastener member. The first and second fastener members are adapted to receive an air bag member having an aperture aligned with respect to the raised surface when the raised surface is received in the recessed surface.

According to yet other embodiments, a method for installing an airbag installation fastener is provided.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 1 is a top perspective view of an air bag bracket/fastener of the present disclosure in a fully open condition;

FIG. 2 is a bottom perspective view of the air bag bracket/fastener of FIG. 1;

FIG. 3 is a bottom plan view of the air bag bracket/fastener of FIG. 1;

FIG. 4 is a side elevational view of the air bag bracket/fastener of FIG. 3;

FIG. 5 is an end elevational view of the air bag bracket/fastener of FIG. 3;

DETAILED DESCRIPTION

Figure 8:
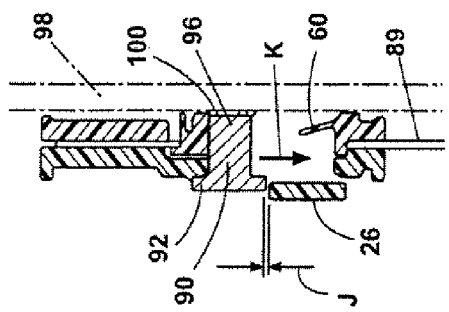
FIG. 8 is a cross sectional end elevational view taken at section 8 of FIG. 6.

The following description is merely exemplary in nature and is not intended to limit the present disclosure, application, or uses. It should be understood that throughout the drawings, corresponding reference numerals indicate like or corresponding parts and features.

Referring generally to FIG. 1, an air bag bracket fastener 10 molded as a single homogenous part or body from a polymeric material includes a first body member 12 and a second body member 14 separated by a hinge section 16. First body member 12 includes a deflectable engagement post 18 which is received through a post receiving aperture 20 provided in second body member 14 to engage first body member 12 to second body member 14 in a fastener closed condition (shown in reference to FIGS. 6-8). Second body member 14 includes a second deflectable engagement post 22 which is received and engaged to first body member 12 at a post receiving aperture or slot 24 of first body member 12. A deflectable catch arm 26 extends laterally away from second body member 14. The first and second fastener members 12, 14, the hinge member 16, and the deflectable catch arm 26 are all homogenously joined in a fastener open condition shown, defined as an as-molded condition of bracket fastener 10.

First body member 12 further includes a raised engagement ring 28 having a plurality of radially extending keys 29 which can be equidistantly spaced about a perimeter of raised engagement ring 28. Raised engagement ring 28 is adapted to be received within a recessed receiving ring 30 of second body member 14. A plurality of key slots 31 substantially equivalent in size and spacing to the radially extending keys 29 are also positioned about recessed receiving ring 30 and are adapted to receive individual ones of the radially extending keys 29 when raised engagement ring 28 is received within recessed receiving ring 30. Bracket fastener 10 can be changed from the fully open extended position to a closed condition by rotating first body member 12 towards second body member 14 about hinge section 16 in a fastener closing direction "A" until a first body surface 32 of first body member 12 substantially contacts a second body surface 33 of second body member 14.

As best seen in reference to FIG. 2, first body member 12 further includes a first keyway aperture 34, and second body member 14 includes a similarly sized second keyway aperture 35. When bracket fastener 10 is moved to the closed condition, first and second keyway apertures 34, 35 are co-axially aligned with each other. A raised perimeter wall 36 is provided about a perimeter of first body member 12 opposite to first body surface 32, and a similar raised perimeter wall 38 is provided about a perimeter of second body member 14 opposite to second body surface 33. Raised perimeter walls 36, 38 are provided to increase the stiffness of each of first and second body members 12, 14. Deflectable catch arm 26 is homogenously connected to second body member 14 at a bending and attachment location 40. A free end of deflectable catch arm 26 includes a first keyhole post 42 and a second keyhole post 44. First and second keyhole posts 42, 44 are spaced from each other and adapted to be lockingly engaged within second keyway aperture 35 as will be described in better detail in reference to FIG. 6. Items 28', 30' refer to opposite faces of raised engagement ring 28 and recessed receiving ring 30, respectively.

Referring now to FIG. 3, hinge section 16 includes each of a first and second hinge arm 46, 48 homogenously extending from first body member 12. A first and second hinge pin 50, 52 are received within each of first and second hinge arms 46, 48 respectively. First and second hinge pins 50, 52 are homogenously connected to a hinge extending member 54 which homogenously extends from second body member 14.

First keyway aperture 34 of first body member 12 includes a substantially circular aperture portion 56 having an elongated slot 58 in communication therewith. A deflectable tab 60 extends partially into circular aperture portion 56. A raised slot wall 62 extends substantially about each of circular aperture portion 56 and elongated slot 58 to provide increased stiffness in the area of circular aperture portion 56.

Second keyway aperture 35 of second body member 14 includes a second circular aperture portion 64 and a second elongated slot 66 in communication therewith. A ramped member 67 is created on a face 68 of second body member 14. Ramped member 67 is substantially flush with face 68 where it is proximately located with respect to second circular aperture portion 64 and increases gradually in height and away from face 68 as it extends in a direction of second elongated slot 66 and away from second circular aperture portion 64.

Deflectable catch arm 26 also includes a semi-circular free end 69 where first and second keyhole posts 42, 44 are homogeneously connected. A semi-circular notch 70 is also created in semi-circular free end 69 which is oriented to open in the same direction as second elongated slot 66 extends. Bracket fastener 10 in the fastener open condition has a total fastener length "B" and a total fastener width "C". According to several embodiments of the present disclosure, total fastener length "B" is approximately 162.3 mm, and total fastener width "C" is approximately 42.3 mm.

Referring now to FIGS. 4 and 5, each of first and second keyhole posts 42, 44 include a ramped barb end 72, 74, respectively. First and second keyhole posts 42, 44 homogenously extend from a first face 76 of an enhanced thickness portion 78 of deflectable catch arm 26. Enhanced thickness portion 78 is connected to second body member 14 by a reduced thickness portion 80 which allows deflectable catch arm 26 to rotate with respect to second body member 14. Deflectable engagement post 18 and second deflectable engagement post 22 have barbed ends which extend opposite to or away from each other. Second deflectable engagement post 22 includes a ramped barb 82 and similarly, deflectable engagement post 18 includes a ramped barb 84. A post-to-post dimension "D" is maintained between distal ends of each of first and second keyhole posts 42, 44 and distal ends of each of deflectable engagement post 18 and second deflectable engagement post 22. According to several embodiments, post-to-post dimension "D" is approximately 12.1 mm.

Additional features of hinge section 16 are more clearly defined in reference to FIG. 4. Each of first and second hinge pins 50, 52 have a substantially triangular shape. First and second hinge pins 50, 52 are received in and co-molded with a triangular shaped aperture 86 of both first and second hinge arms 46, 48. Material flashing 87 created by molding gates when hinge section 16 is molded is frangible when first and second body members 12, 14 are rotated towards each other, breaking the homogenously joined condition of the as-molded body of bracket fastener 10. With specific reference to FIG. 5, post-to-post total dimension "D" defines the portion having a largest depth of bracket fastener 10.

Figure 7:
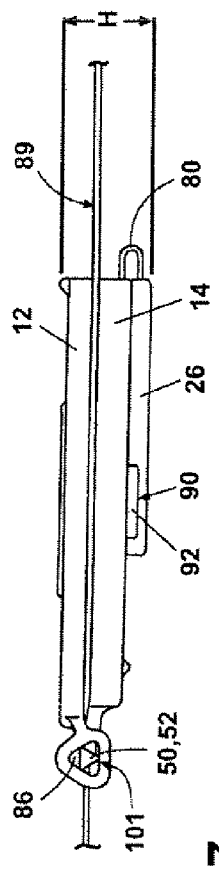
FIG. 7 is a side elevational view of the fully installed air bag bracket/fastener of FIG. 6.
Figure 6:
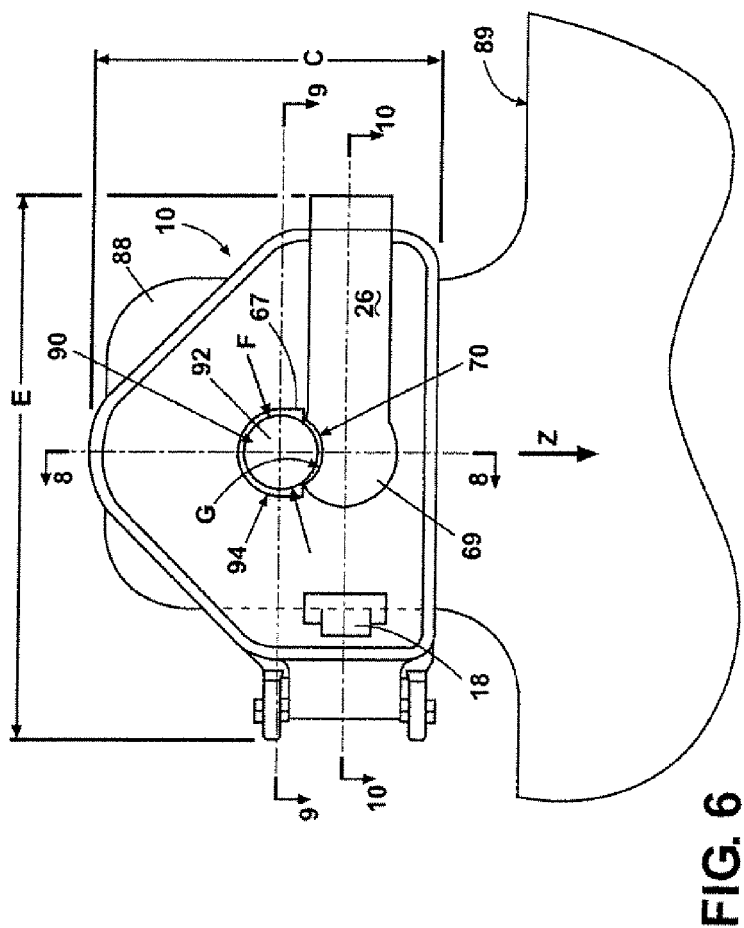
FIG. 6 is a top plan view of a fully installed air bag bracket/fastener of the present disclosure with respect to an extending portion of an air bag.

Referring generally to FIGS. 6 through 8, the installation of bracket fastener 10 is shown. Bracket fastener 10 is used by sandwiching an extending portion 88 of an air bag 89 between each of first and second body members 12, 14. The air bag 89 includes an aperture (not visible in these views) which is aligned with the raised engagement ring 28 and the air bag 89 is partially engaged by the plurality of radially extending keys 29. First and second fastener members 12, 14 are then rotated about hinge section 16 to engage them using engagement post 18 and second deflectable engagement post 22 with the air bag extending portion 88 sandwiched in between. Bracket fastener 10 together with extending portion 88 of air bag 89 form a sub-assembly which can be assembled for example by an air bag manufacturer or supplier. The fastener/air bag sub-assembly can be shipped for example to an automobile manufacturer or component installer wherein the sub-assembly of bracket fastener 10 and air bag 89 are installed for example onto a T-stud fastener 90 having a fastener head 92.

A perimeter edge 94 of ramped member 67 extends beyond a fastener head diameter "F" of fastener head 92 such that pulling bracket fastener 10 and air bag 89 in a direction "Z" with respect to T-stud 90 frictionally engages fastener head 92 onto ramped member 67 with sufficient clearance to allow for individual variations in thickness of air bag 89 and construction tolerances of bracket fastener 10. The completed or fully installed position is defined when deflectable catch arm 26 is rotated about reduced thickness portion 80 and first and second keyhole posts 42, 44 (not visible in this view) are engaged within second keyway aperture 35 of second body member 14. At this time, a radius "G" of semi-circular notch 70 formed in semi-circular free end 69 positions semi-circular notch 70 proximate to or in abutment with a portion of fastener head 92 which acts as a redundant locking member to prevent removal of bracket fastener 10.

As best seen in FIG. 8, in the fully installed position, deflectable tab 60 and deflectable catch arm 26 prevent motion of T-stud 90 in a release direction "K". A clearance "J" can also be provided between deflectable catch arm 26 and fastener head 92. As also shown, a shank 96 of T-stud 90 is commonly attached to a vehicle panel 98 using a connection joint 100 such as a welded joint. T-stud 90 can also be attached to vehicle panel 98 in other ways including but not limited to a threaded connection, or a thread and nut combination.

Referring back to FIG. 7, in the fully installed position with deflectable catch arm 26 rotated about reduced thickness portion 80 and positioned proximate to or in abutment with T-stud 90, an assembled fastener thickness "H" according to several embodiments is approximately 11.2 mm. It is also noted that the triangular points or ends of each of first and second hinge pins 50, 52 are each frictionally engaged with one of a plurality of inner walls 101 defined by triangular-shaped aperture 86. This frictional engagement also provides resistance to separation of first and second body members 12, 14.

Figure 9:
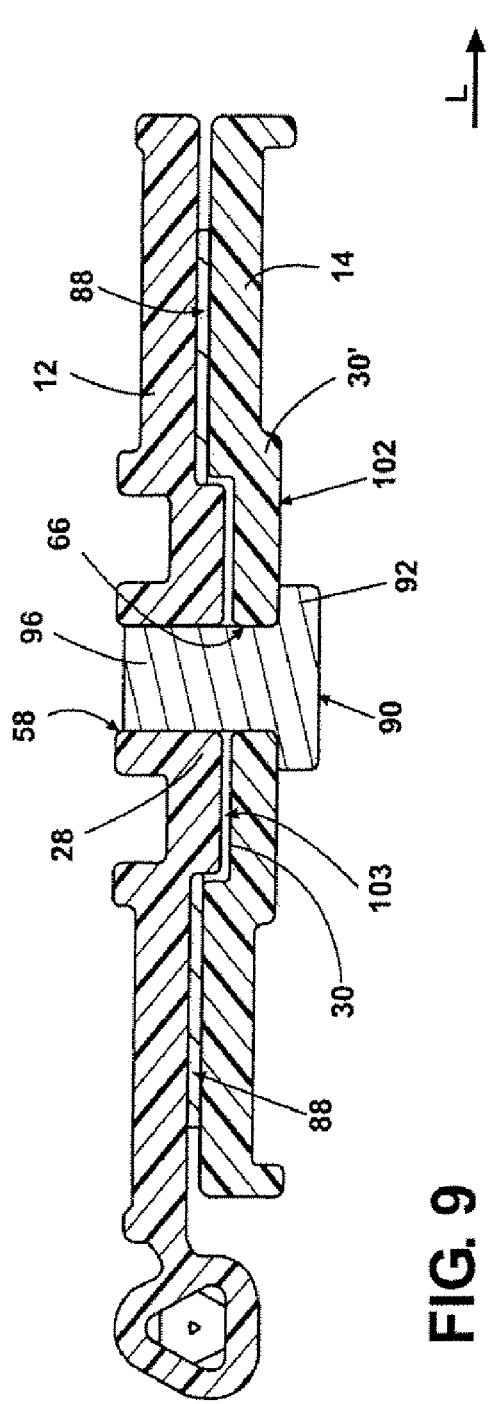
FIG. 9 is a cross sectional side elevational view taken at section 9 of FIG. 6.

Referring now to FIG. 9, in the fully installed position of bracket fastener 10, fastener head 92 of T-stud 90 abuts a raised surface 102 of ring 30'. Shank 96 is received within each of elongated slot 58 and second elongated slot 66. An aperture is created by cutting, punching, or similar removal technique to remove material from extending portion 88 of air bag 89. This aperture has a diameter substantially equal to or larger than a diameter of raised engagement ring 28 so that extending portion 88 is disposed between first and second body members 12, 14 with the aperture overlapped and engaged by radially extending keys 29 (not shown in this view). A cavity 103 is therefore provided between first and second body members 12, 14 where material of air bag 89 is not present between raised engagement ring 28 and recessed receiving ring 30. Cavity 103 provides clearance for installation of bracket fastener 10 about T-stud 90 as well as installation of first and second keyhole posts 42, 44 in second circular aperture portion 64.

Figure 10:
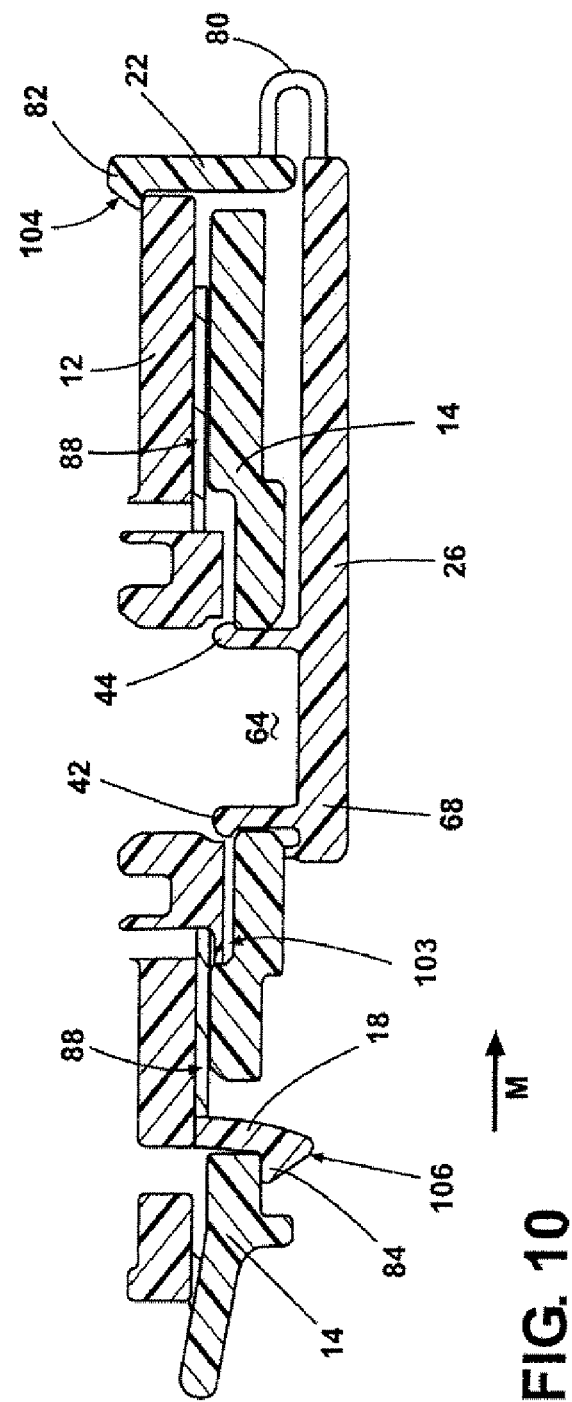
FIG. 10 is a cross sectional side elevational view taken at section 10 of FIG. 6.

As best seen in reference to FIG. 10, ramped barb 82 of second deflectable engagement post 22 includes a ramped surface 104. Ramped surface 104 allows second deflectable engagement post 22 to elastically deflect in an installation deflection direction "L". Similarly, ramped barb 84 of deflectable engagement post 18 also has a ramped surface 106 which allows deflectable engagement post 18 to elastically deflect in an installation deflection direction "M". After deflection of each of ramped surfaces 104, 106, ramped barbs 82, 84 of second deflectable engagement post 22, and deflectable engagement post 18 snap back by elastic deformation to couple first and second body members 12, 14.

Figure 11:
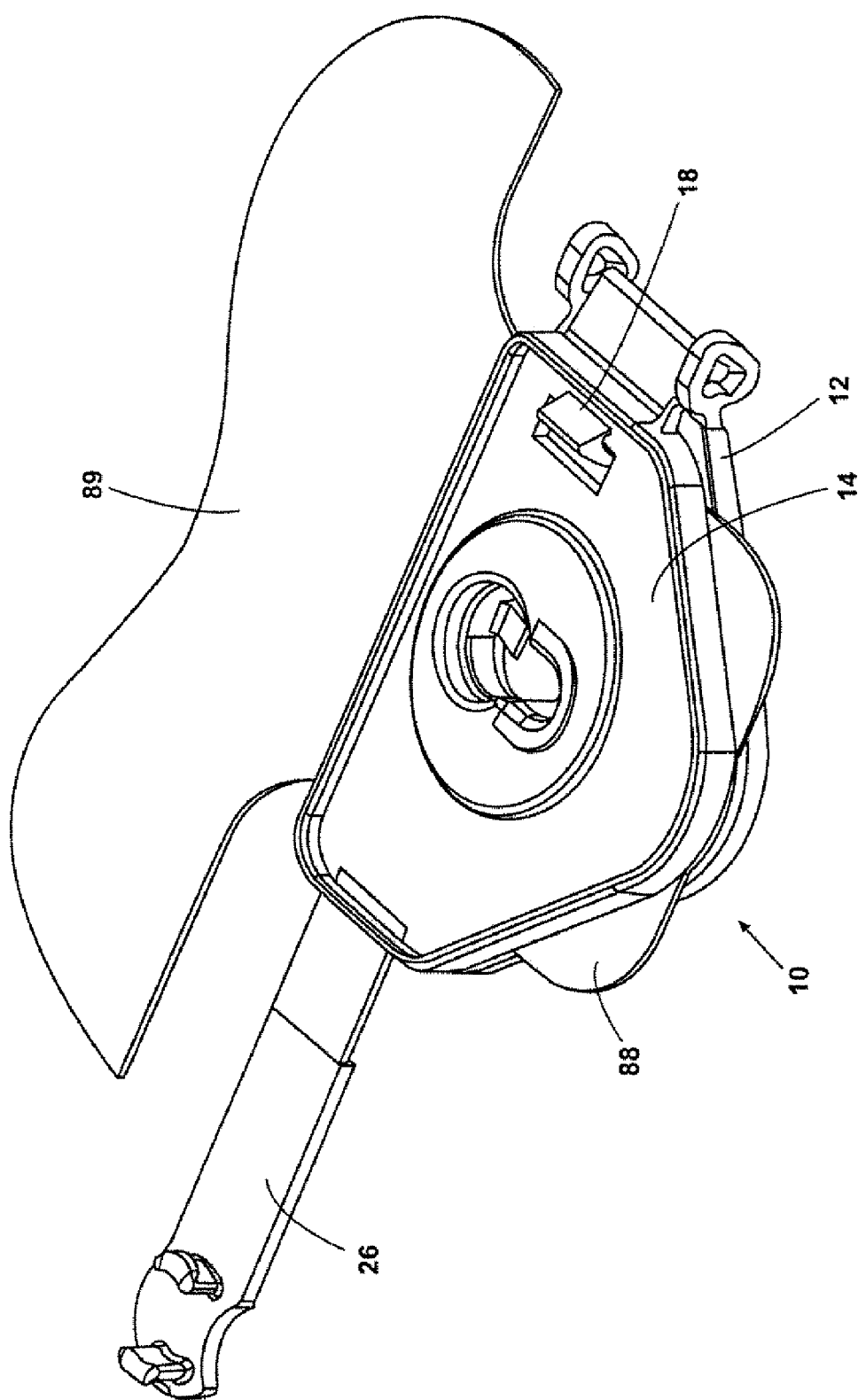
FIG. 11 is a bottom perspective view of a partially installed air bag bracket/fastener of the present disclosure with respect to an extending portion of an air bag.

Referring now to FIG. 11, the sub-assembly of bracket fastener 10 with respect to air bag 89 is shown. This sub-assembly can be completed for example at an air bag manufacturer by partial installation of bracket fastener 10 with respect to extending portion 88 of air bag 89. The sub-assembly is completed by rotating first and second body members 12, 14 until the two body members are engaged to each other using deflectable engagement post 18 and second deflectable engagement post 22 (not clearly visible in this view). Deflectable catch arm 26 remains in its extended position shown. This sub-assembly of components can then be shipped to an installer of air bag 89.

Figure 12:
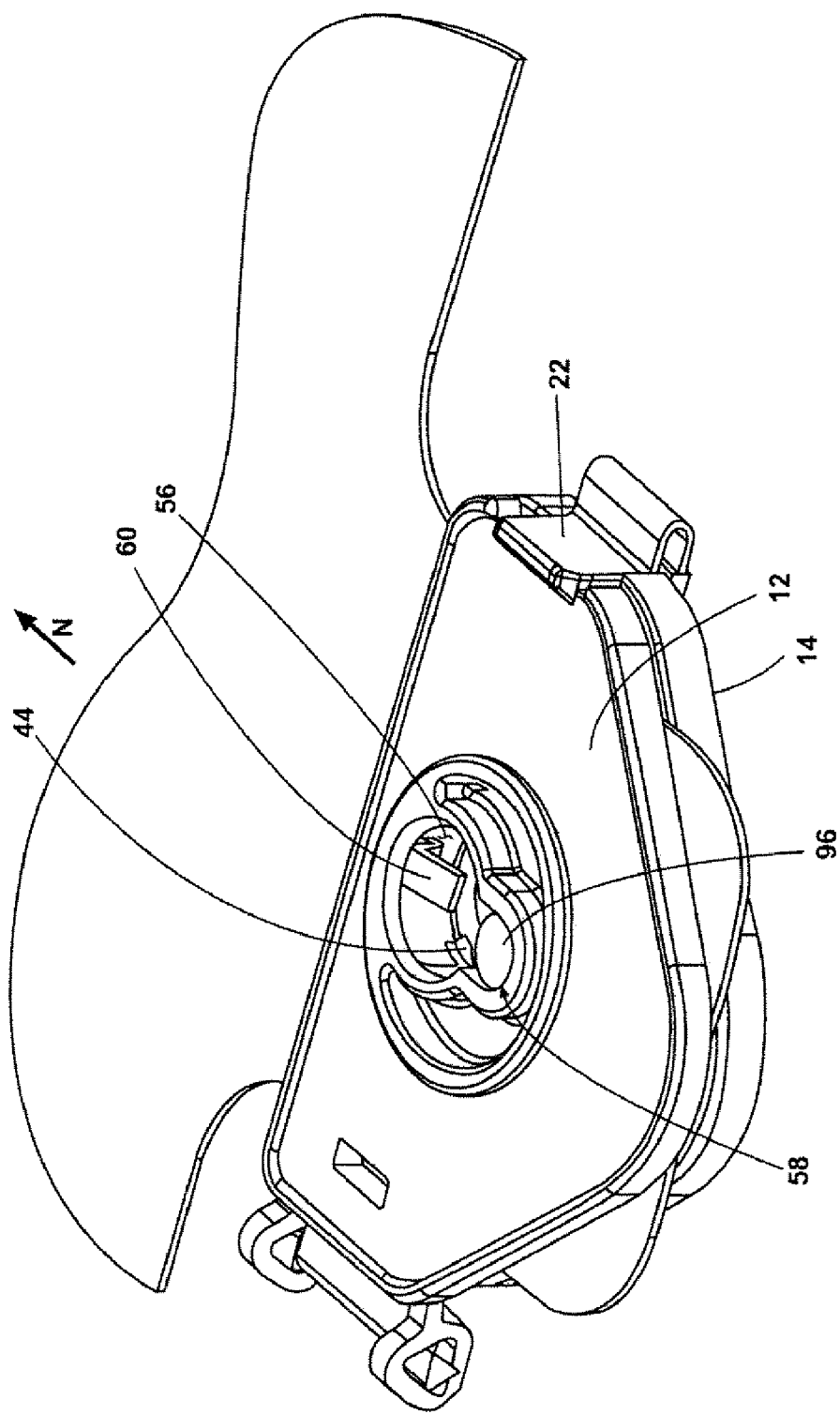
FIG. 12 is a bottom perspective view of a fully installed air bag bracket/fastener of the present disclosure with respect to an extending portion of an air bag.
Figure 13:
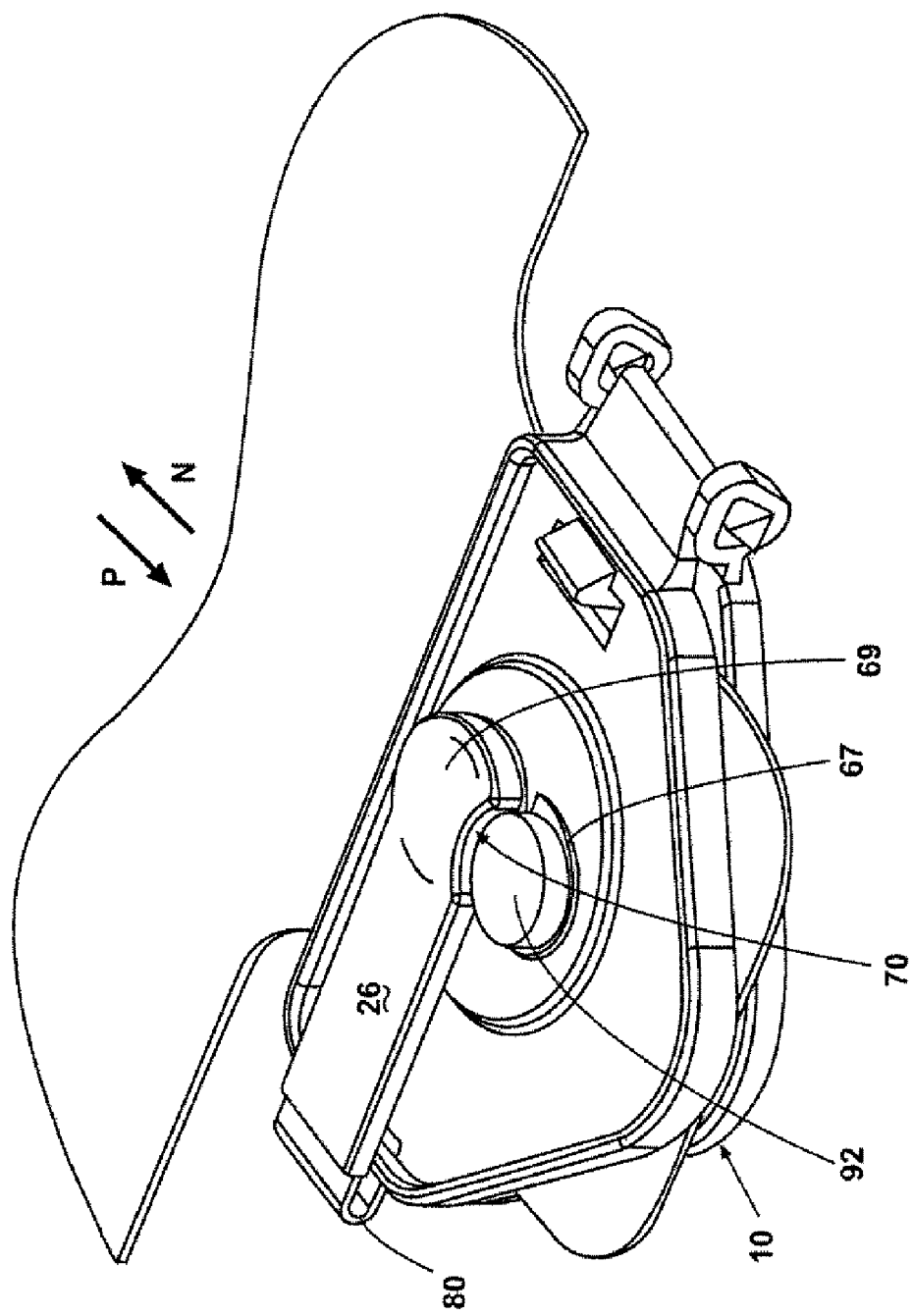
FIG. 13 is a top perspective view of the fully installed air bag bracket/fastener of FIG. 12.

Referring now to FIG. 12, when the sub-assembly as shown in FIG. 11 is received by an installer of air bag 89, the installation of bracket fastener 10 can be continued by inserting bracket fastener 10 over the fastener head 92 of T-stud 90 which elastically deflects deflectable tab 60 (away from the viewer as shown in FIG. 12) to allow fastener head 92 to be received within circular aperture portion 56. By then pulling both bracket fastener 10 and air bag 89 in an installation direction "N" with respect to T-stud 90, shank 96 is positioned within elongated slot 58 as shown. Second deflectable engagement post 22 and second keyhole post 44 are also shown in their snap engaged positions.

To complete the installation of bracket fastener 10, deflectable catch arm 26 is rotated at reduced thickness portion 80 until semi-circular free end 69 is positioned as shown having semi-circular notch 70 positioned proximate to (i.e.: in a side-by-side configuration with) fastener head 92 which provides visual confirmation that the assembly is complete as well as preventing motion of bracket fastener 10 in either of the installation direction "N" or a removal direction "P". The position of semi-circular free end 69 as shown therefore provides an auditable indication of a complete and correct installation of bracket fastener 10.

Air bag bracket fasteners 10 of the present disclosure can be made of one or more polymeric materials suitable for molding for example by an injection molding process. According to several embodiments, bracket fastener 10 is made using a polyamide 6-6 material. According to several embodiments, T-studs used in applications for bracket fasteners 10 of the present disclosure can have a shank diameter of approximately 5 mm and a head diameter of approximately 9 mm. These dimensions and the other dimensions defined herein are not limiting to the present disclosure and can vary at the discretion of the manufacturer to suit different quantities or sizes of T-studs, or different attachment fasteners such as screws, bolts, and the like.

Air bag bracket fasteners of the present disclosure offer several advantages. By co-molding each of the body members, hinge portion, and catch arm, a fastener is created which tends to remain in a fully open or extended position until the body members are rotated. Once rotated to a closed condition, the barbed posts and the interference or friction between the triangular-shaped hinge pins and the corresponding walls of the hinge pin apertures act to resist re-opening of the fastener after an air bag extending portion is engaged between the body members. By combining keyway apertures with a deflectable tab, when the fasteners of the present disclosure engage a fastener such as a T-stud, the fastener further resists removal. The catch arm with a corresponding T-stud notch of the present disclosure used as a final installation step provides both a visual confirmation of a completed fastener installation, as well as a redundant locking member to further resist removal or re-opening of the air bag bracket fastener. The keys and corresponding key slots of the present disclosure provide for engagement of the air bag extending portion both before and after the air bag bracket fastener is closed.

What is claimed is:

1. An airbag installation fastener, comprising:
   first and second fastener members connected by a hinge member, the first and second fastener members adapted to rotate from a fastener open condition to engage each other in a fastener closed position, the fastener closed position having an air bag member positioned between the first and second fastener members, each of the first and second fastener members having an aperture adapted to receive a vehicle connected stud to support both the airbag installation fastener and the air bag member from the stud; and
   an arm extending from the second fastener member adapted to rotate with respect to the second fastener member, the arm extended from the second fastener member in the fastener closed condition and operable to both engage the second fastener member and to abut the stud to visually indicate a fastener completed installation condition.

2. The airbag installation fastener of claim 1, further comprising:
   a raised engagement ring of the first fastener member having the aperture extending through the raised engagement ring; and
   a recessed receiving ring of the second fastener member adapted to receive the raised engagement ring in the fastener closed position.

3. The airbag installation fastener of claim 2, further comprising:
   a plurality of keys radially extending away from the raised engagement ring; and
   a plurality of key slots created in the recessed receiving ring positioned to correspond to and receive individual ones of the keys of the raised engagement ring in the fastener closed position;
   wherein the air bag includes an aperture aligned with the raised engagement ring and the air bag is partially engaged by the plurality of keys.

4. The airbag installation fastener of claim 1, wherein the arm comprises:
   at least one hooked member adapted to be received in the aperture of the second body member; and
   a notch adapted to partially receive a head of the stud, the notch positioned in a side-by-side configuration with the stud allowing visibility of the stud and the arm in the completed installation condition.

5. The airbag installation fastener of claim 1, wherein the arm includes each of a first thickness portion and a second thickness portion, the first thickness portion homogenously connected to the second fastener member and being thinner than the second thickness portion to promote bending of the arm in the first thickness portion, the second thickness portion freely extending away from the second fastener member.

6. The airbag installation fastener of claim 1, wherein the first fastener member includes an extending deflectable member having a hooked end adapted to be received in an aperture of the second fastener member to engage the first and second fastener members in the fastener closed position.

7. The airbag installation fastener of claim 1 wherein the second fastener member includes an extending deflectable member having a hooked end adapted to be received in a slot of the first fastener member to engage the first and second fastener members in the fastener closed position.

8. The airbag installation fastener of claim 1, wherein each of the first and second apertures define a keyway aperture having a substantially circular aperture in communication with an elongated slot.

9. The airbag installation fastener of claim 1, wherein the first and second fastener members, the hinge member, and the arm are all homogenously joined in the fastener open condition and created from a moldable polymeric material.

10. The airbag installation fastener of claim 1, wherein the at least one hooked member comprises opposed first and second hooked members each having a ramped surface operable to promote deflection of the first and second hooked members.

11. An airbag installation fastener for connecting an airbag to an automobile vehicle, comprising:
    a polymeric body having homogenously connected members in a fastener open condition, the body including first and second fastener members and a hinge member between the first and second fastener members;
    at least one deflectable engagement post homogenously extending from one of the first and second fastener members, the other one of the first and second fastener members having an aperture adapted to receive the engagement post to engage the first and second fastener members;
    a hinge pin homogenously connected to the second fastener member received in a hinge pin aperture of a hinge arm homogenously connected to the first fastener member;
    wherein the first and second fastener members are adapted to rotate from the fastener open condition to a fastener closed condition frangibly disconnecting the hinge pin from the hinge arm, the fastener closed condition having the first and second fastener members engaged to each other by the engagement post and adapted to receive an air bag member between the first and second fastener members.

12. The airbag installation fastener of claim 11, wherein each of the first and second fastener members include an aperture adapted to receive a vehicle connected stud to support both the airbag installation fastener and the air bag member from the stud.

13. The airbag installation fastener of claim 11, further comprising an arm member homogenously extending from the second fastener member adapted to rotate with respect to the second fastener member, the arm member extended from the second fastener member in both the fastener open condition and the fastener closed condition, and operable to both engage the second fastener member and to abut the stud in a completed fastener installation condition.

14. The airbag installation fastener of claim 11, wherein the hinge pin defines a triangular shape.

15. The airbag installation fastener of claim 11, wherein the hinge pin aperture defines a triangular-shape adapted to frictionally receive the hinge pin as the hinge pin rotates.

16. An airbag installation fastener for connecting an airbag to an automobile vehicle, comprising:
a first fastener member having a raised surface;
a second fastener member adapted to engage the first fastener member, the second fastener member having a recessed surface adapted to receive the raised surface of the first fastener member;
wherein the first and second fastener members are adapted to receive an air bag member having an aperture aligned with respect to the raised surface when the raised surface is received in the recessed surface.

17. The airbag installation fastener of claim 16, further comprising an engagement post having a barbed end extending from one of the first and second fastener members, the barbed end of the engagement post adapted to be received by an aperture of the other one of the first and second fastener members to engage the first and second fastener members.

18. The airbag installation fastener of claim 16, further comprising an arm homogenously extending from the second fastener member, the arm having at least one engagement post homogenously and transversely extending from the arm adapted to engage a receiving aperture of the second fastener member.

19. The airbag installation fastener of claim 16, further comprising a hinge section coupling the first and second fastener members, the hinge section having opposed triangular-shaped hinge pins received in triangular-shaped hinge pin apertures of opposed hinge arms.

20. The airbag installation fastener of claim 16, further comprising:
a plurality of keys radially extending from the raised surface;
a plurality of key slots radially extending from and in communication with the recessed surface, the key slots adapted to receive individual ones of the keys when the first fastener member is engaged with the second fastener member.

21. The airbag installation fastener of claim 16, further comprising a keyway shaped aperture created in each of the first and second fastener members located within each of the raised and recessed surfaces, respectively, the keyway shaped apertures coaxially aligned when the first fastener member is engaged with the second fastener member, and adapted to receive a vehicle body mounted fastener to support the airbag installation fastener.

22. The airbag installation fastener of claim 21, further comprising a ramped surface positioned proximate to the keyway shaped aperture of the second fastener member, the ramped surface operable to engage a head of the vehicle body mounted fastener and force the first fastener member toward the second fastener member to frictionally sandwich the air bag member.

23. A method for installing an airbag installation fastener, the airbag installation fastener including a polymeric body having homogenously connected members in a fastener open condition, the body including first and second fastener members connected by a hinge member; a raised engagement ring of the first fastener member; a recessed ring of the second fastener member; a deflectable engagement post homogenously extending from one of the first and second fastener members; and an arm member homogenously extending from the second fastener member, the method comprising:
rotating the first and second fastener members toward each other about the hinge member until the deflectable engagement post is received by an aperture of the other one of the first and second fastener members to engage the first and second fastener members with an air bag member sandwiched in between;
attaching the first and second fastener members with the air bag member sandwiched between to a vehicle connected fastener; and
swinging the arm member to engage the arm member with the second fastener member and to position the arm member proximate to the vehicle connected fastener to visually indicate a completed installation of the air bag installation fastener.

24. The method of claim 23, further comprising aligning an aperture of the air bag member with the raised engagement ring prior to the rotating step.

25. The method of claim 23, further comprising homogenously connecting a hinge pin to the second fastener member adapted to be received in a hinge pin aperture of a hinge arm homogenously connected to the first fastener member.

* * * * *